United States Patent Office 2,984,576
Patented May 16, 1961

2,984,576

USES OF ZIRCONIA SOLS

Guy B. Alexander and John Bugosh, Wilmington, Del., assignors to E. I. du Pont de Nemours and Company, Wilmington, Del., a corporation of Delaware No Drawing. Filed Oct. 10, 1956, Ser. No. 615,003

4 Claims. (Cl. 106—55)

This invention relates to compositions which contain as a binding agent a metal oxide selected from the group consisting of zirconia and hafnia in the form of particles having a surface area from 5 to 400 m.$^2$/g., being composed of ultimate particles of 5 to 200 millimicrons average diameter and which when dispersed in a liquid medium forms a dispersion in which the percent of solids in the dispersed phase is at least 30. The invention is further directed to processes for preparing such compositions.

Zirconia and hafnia sols or finely divided powders can be used as binding agents in a wide variety of applications. These can range from refractories in which the zirconia or hafnia serve to bind components together to plastic material in which they serve a similar function. Likewise, they can be used to bind organic acids or other organic compounds such as dyes. The above and further compositions of the invention will be described hereafter.

The zirconia and hafnia sols and products employed in compositions and processes of the invention and processes for their preparation are described in our copending application Serial No. 625,188, filed November 29, 1956, as a continuation-in-part of our then copending application Serial No. 566,969, filed February 21, 1956, now abandoned.

Briefly, an aqueous solution of a basic zirconium or hafnium salt is heated under pressure. There can be used zirconium oxychloride $ZrOCl_2 \cdot 8H_2O$, zirconium oxynitrate $ZrO(NO_3)_2 \cdot 2H_2O$, their corresponding hafnium salts and other basic zirconium and hafnium salts in which the anion corresponds to a strong monobasic acid. Thus the anion can be that of the strong monobasic acids, namely, those which have a dissociation constant greater than 0.1 at 25° C.

The basicity of the zirconium and hafnium salts can vary from, broadly, a mol ratio of anion:zirconium or anion:hafnium from 0.5:1 to 4:1. It is preferred to use mol ratios between 1:1 and 2:1. The zirconium or hafnium salt is hydrolyzed under pressure to produce a zirconia or hafnia sol. The temperature will range from about 120 to 300° C. though it is preferred to use a temperature between 120 and 150° C. At 125° C. about one hour is sufficient to effect substantially complete hydrolysis. A time from about 1 to 4 hours will be required depending upon conditions and the degree of hydrolysis desired.

Excess acid can be removed by dialysis, precipitation, ion exchange, or in any other suitable manner. The removal of acid can for example be effected by a procedure as described in Rule U.S. Patent 2,577,485, column 8, beginning at line 46. The final pH can range broadly from about 2 to 6 while more specifically it is preferred that the pH be from about 3 to 5.

Sols as prepared by hydrolysis followed by the removal of excess acid can be concentrated. Sols with particles around 5 millimicrons can be concentrated to about 25 percent $ZrO_2$ or $HfO_2$. Sols containing larger particles, say, 100 millimicrons or more can be concentrated to as much as 50 percent $ZrO_2$ or $HfO_2$. Sols can be concentrated beyond the ranges stated and they become viscous or even paste-like. In preparing compositions of the invention the concentrated sols, dilute sols, or even the paste-like products can be used depending upon the specific final product.

If the autoclaving and hydrolysis process was conducted on a rather concentrated solution, then particularly at higher temperatures and for longer periods of time, the product of the hydrolysis will be a precipitate. Supernatant liquid can be removed, excess acid can be removed as by ion exchange to yield a product in the pH ranges previously indicated. The precipitated zirconia or hafnia peptizes and upon standing forms sols which are similar or identical to those prepared by hydrolysis of more dilute solutions.

The aqua-sols prepared as above described can be converted to organosols which can contain more or less water as described. The sols can be transferred to organic solvents by mixing them with a solvent which forms an azeotrope with water and removing the water by azeotropic distillation. It is preferred to use polar, water-miscible organic solvents. Preferred solvents include normal or isopropanol, ethylene glycol, dimethyl formamide "Cellosolve," and the like.

The organosols can be concentrated to form very thick dispersions or even pastes. They can be completely dried to produce dry powders which can be used in making products of the invention. The organic solvent can, if desired, be removed above the critical pressure to produce products which are somewhat more voluminous.

The zirconia or hafnia particles can also be dried from water or from non-aqueous systems. There is somewhat more aggregation when the sols are dried from water than when dried from organic solvents but the dry products can be incorporated into compositions of the invention by thorough mixing or milling, with or without the addition of water or other liquids.

The sols and dry dispersible powders to be used in compositions of the invention are characterized by containing ultimate zirconia or hafnia particles which are at least 5 millimicrons in diameter and which are in the colloidal size range and which additionally are dense. Thus the particles can range in size between 5 millimicrons and the upper limit of colloidal size, about 150 millimicrons. More broadly, the particle size can range upwardly to 200 millimicrons in diameter. At this dimension there will be a considerable tendency for the particles to settle.

The ultimate particle size of the individual zirconia and hafnia particles, which may occur as loose aggregates in sols or powders to be used in compositions of the invention, are best determined by nitrogen surface area determination, although their general character may be ascertained by use of the electron microscope.

When the products are prepared at about 150° C. the particles and particularly their aggregates will be found to be irregular in shape. By electron diffraction the zirconia particles show a pattern similar to the mineral baddeleyite. When the products are prepared at temperatures below 150° C. the particles are amorphous.

In referring to the ultimate particles as having a diameter of 5 millimicrons, for example, it is intended to refer to the smallest average dimension of the ultimate particle. Also, in speaking of the particles as having a certain diameter, it is intended, as will be apparent, to refer to the average diameter of all particles in the sol or product.

As indicated above the particle size and character of the sols and dry powders can be defined by nitrogen adsorption. A method for determining nitrogen adsorption is described in "A New Method for Measuring the Surface Areas of Finely Divided Materials and for Determining the Size of Particles," by P. H. Emmett, in "Symposium on New Methods for Particle Size Determination in the Subsieve Range" in the Washington Spring Meeting of A.S.T.M., March 4, 1941. The sol to be measured is deionized, transferred to propanol by distillation, and dried in a vacuum oven.

The prefered zirconia and hafnia ultimate particles are in the size range of 5 to 25 millimicrons. The surface area of the ultimate particles in m.$^2$/g., A, is related to the average diameter, D, as measured by electron micrograph by the range $$A = \frac{1000}{D} \text{ to } \frac{2000}{D}$$

for zirconia particles. Because of the higher density of HfO$_2$, the relationship is $$A = \frac{600}{D} \text{ to } \frac{1200}{D}$$

The particles of the sols and dry powders to be used in compositions of the invention are further characterized in that the percent of solids in the dispersed phase, as in a sol, is at least 30. The dry powders must be dispersed in a suitable medium to effect this measurement, preferably water, at pH 2.5 to 4 and containing chloride as a stabilizer. It is prefererd that the percent of solids in the dispersed phase be at least 50. This fiigure for the percent of solids in the dispersed phase reflects the fact that the products are very dense and contain less water within and upon the zirconia or hafnia particles than particles of sols which are spongy and gel-like, and are prone to ready gelation.

The figure just described can be computed from the following series of relations:

The relative viscosity N$_r$ of zirconia or hafnia sols can be determined from the drain time of the sol, $t_s$, and the drain time of water, $t_w$, in an Ostwald pipette, and the specific gravity of the sol, d, $$(1) \quad N_r = \frac{t_s d}{t_w}$$

Mooney (J. Colloid Sc., 6: 162–170, 1951) has developed the relationship between viscosity and the percent solids in the dispersed phase for spherical colloidal particles:

$$(2) \quad \ln N_r = \frac{2.5c}{1 - 1.43c}$$

where ln N$_r$ is the natural logarithm of N$_r$, the relative viscosity of a colloidal sol. In the relation c is the fraction of the total volume which is occupied by the viscosity creating phase. Although the colloidal zirconia or hafnia particles described herein are not spherical, one can calculate a relative value of c using the above Mooney equation and from this one can obtain a relative estimate of the percent zirconia or hafnia by weight in the dispersed colloidal particles from the relation:

$$(3) \quad S = \frac{Z}{c(1 - 0.00825Z) + 0.00825Z}$$

where S is the percent ZrO$_2$ or HfO$_2$ in the dispersed phase and Z is the percent ZrO$_2$ or HfO$_2$ in the sol as measured by quantitative analysis.

As noted above, the percent of solids in the dispersed phase, S, is at least 30 for products of the invention. The value of S, as calculated by the above relationship, is in the range of 45 to 80 for preferred products to be used in composition of the invention. It is noted that the value of S of about 80 is equivalent to 100 because of errors in the assumption that the particle is spherical and because of the presence of a monolayer of water on the particle. Thus, with true spheres the value for S would be a maximum at about 90.

The concentration of aqua-sols to be used in preparing compositions of the invention can vary widely. Sols prepared as above described can be concentrated to 10 percent ZrO$_2$ or HfO$_2$ or more as desired. They can be concentrated to 50 percent ZrO$_2$ or HfO$_2$, or more without gelation particularly where the particle size is relatively large. It is generally preferred that the sols contain at least 10 percent ZrO$_2$ or HfO$_2$. Organo-sols can similarly be concentrated.

The zirconia:anion or hafnia:anion ratio of the preferred sols to be used in compositions of the invention is in the range of 8:1 to 40:1. This corresponds to a preferred pH range of 2.5 to 5.

One of the preferred types of products to be used in compositions of the invention is a stable, colloidal, zirconia or hafnia aquasol containing from 5 to 25 millimicron particles and having a pH in the range of 3 to 5. Such sols are stabilized with chloride or nitrate and contain more than 15 percent of solids. By stable sols is meant those which, on storage at room temperature for three months, do not increase in viscosity.

Sols and powders to be used in compositions of the invention are composed of zirconia and hafnia particles which have a specific surface area of 5 to 400 m.$^2$/g. as measured by nitrogen adsorption. More specifically it is preferred to use products with a specific surface area of from 5 to 200 m.$^2$/g.

The preparation of zirconia and hafnia sols and powders and their characterization is further described in our copending application heretofore identified and reference may be had to said application for further details.

The aqua-sols, organosols, and dry dispersible products as above described can be used in a wide range of compositions. In such compositions the zirconia or hafnia particles ordinarily have a binding effect in addition to other valuable effects.

Zirconia and hafnia particles can be incorporated into elastomers and into organic plastics broadly.

When zirconia and hafnia are incorporated into elastomer products this can be done at any point in their manufacture, including the original formation of the polymer. The elastomer in which zirconia and hafnia are incorporated according to this invention can be any rubber-like polymeric material. The term "elastomer" is a general descriptive term for this class of products and may be regarded as an abbreviation for "elastopolymer" or "elastic polymer." (See "Advances in Colloidal Science," vol. 2, 1946, p. 25.) As here used it may be understood to cover the high molecular elastic colloidal natural caoutchouc, as well as synthetic rubbers and rubber-like materials such as neoprene, butyl rubber, and the styrene-butadiene copolymer known as GR–S. More particularly, some of the elastomers included are butadiene copolymerized in various ratios with styrene, butadiene copolymerized in various ratios with acrylonitrile, polymerized butadiene, polymerized 2,3-dimethyl butadiene, polymerized 2-chlorobutadiene, 1,3-isobutylene copolymerized with isoprene, copolymers of butadiene and methylmethacrylate, butadiene copolymerized with methylvinyl ketone, and various other copolymers of butadiene with ethylenic-unsaturated monomers. It will be noted that the invention is applicable to diene elastic polymers as a class. Zirconia and hafnia can also be used with chlorosulfonated polyethylene known commercially as "Hypalon," polyesters, polyester amide, polyurethane, fluorocarbon and polyacrylic ester rubbers.

The zirconia and hafnia can be added to a latex of the elastomer, that is, an aqueous dispersion of the elastomer. Acidic or cationic latices will generally be preferred to avoid premature gelation on mixing. In this manner very uniform dispersions of the zirconia and hafnia throughout the latex is achieved. The latex and the zirconia and hafnia can then be coagulated, resulting in the formation of the solid elastomer composition containing the dispersed zirconia and hafnia. A latex containing, say 2 to 30%, zirconia and hafnia can be formed into sponge or foam products. A finished sponge or foam of natural or synthetic rubber or other elastomer can be treated with an aqueous zirconia or hafnia sol, say a 2 to 15% $ZrO_2$ or $HfO_2$ sol in order markedly to improve the load carrying capacity of the foam.

Latices containing zirconia and hafnia sols may be employed as coatings, saturants or impregnants and in the manufacture of highly reinforced, opaque dipped goods.

Zirconia and hafnia can be milled into silicone rubbers for strengthening and reinforcing effects. They can also be incorporated into the organosilicon oils and low molecular weight intermediates which are subsequently polymerized to form silicone rubber.

Although for many applications incorporation of zirconia and hafnia with the elastomers in the form of latex is advantageous, even better zirconia and hafnia elastomer compositions for many uses are obtained by milling the zirconia and hafnia into the solid elastomer in a conventional manner. The zirconia and hafnia aqua-sols can either be added to the latex, coagulated and the resulting crumb dried and milled, or the dry zirconia and hafnia can be added directly to the elastomers on the rubber mill.

The compounding of the stocks can be carried out by practices commonly used in the rubber industry. The rubber can be broken down on a cold rubber mill until it is sufficiently plasticized to permit the dry ingredients to be incorporated readily. The dry ingredients can then be added in the following order: sulfur, zinc oxide, stearic acid, zirconia or hafnia with or without other filler, and finally the accelerator. The stock can then be allowed to rest 12 to 24 hours at room temperature and then returned to the mill and milled briefly to ensure thorough dispersion of curing agents and fillers. The stocks so prepared can then be molded, extruded, calendered and finally vulcanized by methods commonly used in the rubber industry. When zirconia and hafnia are employed in elastomers as described in the preceding few pages the amount, like that for other fillers and the like, will generally range from about 1 to 50% by weight based upon the weight of the elastomer. For especially stiff, hard, stocks even larger quantities may be used.

Zirconia and hafnia can be used in plastics in manners analogous, and in amounts comparable, to those described for the use in rubber. For example, zirconia and hafnia can be used in making highly opaque plastic films. When incorporated into the organic polymer prior to extrusion into sheets, tubing, or lacing, the zirconia and hafnia generally improves the tensile strength, stiffness, hardness and in many instances, tear strength. Plastic flow of the finished article is often greatly reduced.

Zirconia and hafnia can function as a dispersing agent in organic polymer dispersions. Incorporation of zirconia and hafnia into intractable polymers such as solid "Teflon" polytetrafluoroethylene aids in stabilizing dispersions of these materials by providing polar sites for adsorption of a stabilizing agent.

The zirconia and hafnia can be used along with a wide variety of other fillers, including wood flour, diatomaceous earth, carbon black, clay, whiting, cellulose block, glass, glass fibers and other conventional fillers and reinforcing agents. They are especially effective as opacifiers, because of high refractive index and at the same time contribute increased strength and toughness.

The term "organic polymer" is used herein to include both natural and synthetic polymeric materials. Organic polymers adapted to be compounded with the zirconia and hafnia of this invention include: cumarone resins; indene resins; acetylene polymers, including their halogenated derivatives; olefin hydrocarbon polymers, including polymers of ethylene and butadiene and their homologs, and halogen substituted derivatives thereof including polytetrafluoroethylene; olefin-sulfur dioxide resins; petroleum resins, including resins formed by oxidation of petroleum and resins formed by reaction of petroleum constituents with such materials as formaldehyde, methylal, metallic halides, sulfur, and sulfur chloride; nylon (polyamide) resins; casein and other protein plastics including casein-formaldehyde plastics; resins from halogenated petroleum hydrocarbons; resins from cracked hydrocarbons; polystyrene and polymers from styrene derivatives; phenolic resins (the phenolic resins can be A-stage resins, or resols; B-stage resins, or resitols; or resites, or C-stage resins); terpene phenolic resins, Novolak or of the infusible types; phenol-aldehyde resins such as phenol-formaldehyde resins; aldehyde resins; furfural resins; ketone resins, urea-formaldehyde type resins; including thiourea-formaldehyde, melamine-formaldehyde, and dicyan-diamide-formaldehyde resins; resorcinol - formaldehyde resins, phenol-resorcinol-formaldehyde resins, and phenol-furfural resins; furan resins; amine-aldehyde resins; melamine resins; urea-modified melamines; co-condensation products of melamine-formaldehyde resins and diglycol carbamate; polyester resins such as the copolymers of diallyl phenyl phosphonate with monomers such as methyl methacrylate, vinyl acetate, diallyl phthalate, diallyl succinate, diallyl oxalate, and unsaturated alkyd resin mixtures; modified alkyl resins prepared by polymerization of phthalic anhydride, maleic anhydride, or sebacic acid or other high molecular weight polybasic acid, with a polyhydric alcohol such as glycerol, the glycols, pentaerythritol, or sorbitol; sulfonamide-aldehyde resins; nitro resins; resins from such nitrogen-containing materials as hydrazide and related substances, pyrazoles, pyridine, quinoline, pyrrole, indole, and carbazole; resins from wood and from carbohydrates; natural resins and their esters, including rosin, shellac, and ester gum; condensation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters, including esters of inorganic acids; polyvinyl acetals, polyacrylic acids, anhydrides, esters, amides, and homologs thereof; rubber and its derivatives, including rubber hydrochloride and halogenated rubber; condensation resins from halogenated compounds, olefin-sulfide resins such as the reaction product of ethylene dichloride and alkali polysulfide; phenol - sulfur and phenol-sulfur chloride resins; sulfur-aromatic amine resins; factice; drying oil resins, cellulose and its derivatives, including cellophane, cellulose esters, and cellulose ethers; polyacrylonitrile; polymerized esters of terephthalic acid and glycols of the series $HO(CH_2)_nOH$ where $n$ is an integer; and proteins such as casein, zein, soybean protein and leather.

These can be modified with any of the usual modifying agents including plasticizers, pigments, fillers, dyes, and materials which combine chemically with the polymer ingredients either during formation of the polymer or during and after treatment. Thus copolymers, interpolymers, and mixtures of polymers can advantageously be compounded by the process of this invention.

The organic polymer can take any form including sheet, rod, tube, supported film, unsupported film, molded article, cast article, powder, and the like. Zirconia and hafnia are useful to improve the impact strength and toughness of copolymers of vinyl acetate and vinyl chloride of the type used for phonograph records, using say 1 to 25% by weight.

Deionized colloidal zirconia sols are especially useful as sizing agents for fabrics and textiles to confer resistance to soiling and static buildup. Colloidal zirconia can be incorporated in or used as a surface treatment for synthetic fibers to reduce sheen. It is especially effective with synthetic polyacrylonitrile fibers such as "Orlon," "Dacron" polyester, and nylon polyamide types.

Collodial zirconia is valuable as an ingredient of tanning compositions, especially for white leather. In dry form colloidal zirconia may be used to advantage in combination with television and other fluorescent phosphor screens. Colloidal zirconia is useful as a component of filters for cigarettes because of its high adsorption characteristics. It is effective in flameproofing compositions for textiles, paints, paper, and other combustible articles.

Adsorptive capacity and thermal stability of colloidal zirconia are especially advantageous properties in the formulation and modification of solid rocket propellants for combustion control. In the form of organic soluble organosols colloidal zirconia is an effective agent in liquid fuels for flame propagation control.

Because of the high specific gravity of zirconia and hafnia, the more concentrated stable sols of this invention are useful as high density fluids and find application as energy transfer media, for example in fluid drive mechanisms, and in centrifugal seals and pressure sensing devices.

Polymers containing zirconia and hafnia as above described can be further modified by subjecting the composition to irradiation from a high energy electron source. By this means chemical bonds between the polymer molecules and the zirconia and hafnia can be obtained with a resulting increase in the strength of the composition. Thus, remarkably tough films can be obtained by irradiating polyethylene containing from about 1 to 60 percent by weight of zirconia and hafnia.

The zirconia and hafnia can be incorporated into organo-inorganic plastics of the organo-silicon or "silicone" types, for example, condensation products of hydrolyzed alkyl chlorosilanes, aryl chlorosilanes, and mixed alkylaryl chlorosilanes, yield silicone polymers suitable for modification with zirconia and hafnia. Polymeric silicone esters such as the butoxy "silicone" and the resinous partial hydrolysis products of ethyl silicate can be compounded with zirconia and hafnia.

It will be understood that coating compositions, including decorative finishes and protective coatings can be prepared from the above compositions comprising zirconia and hafnia and organic polymers. The coating compositions can be added either in the form of solutions in solvents or in the form of dispersions or emulsions such as water based paints.

In varnishes, nitrocellulose, lacquers or alkyl finishes, zirconia and hafnia are particularly advantageous from the standpoint of providing high opacity and hiding power without detracting from the smoothness, toughness or other qualities of the finish.

Zirconia and hafnia particles of the invention can be used as substrates for the formation of lakes and the lakes thus prepared can be added to any of the plastic and elastomer compositions above described. For example, the zirconia or hafnia particles can be dyed while in water solution or in an appropriate organic solvent. Either acid or basic dyes can be used. Lakes can be prepared as shown in British Patent 672,923 to Stevens which describes the formation of lakes using another type of zirconia substrate. With acid dyes, adjustment of pH will not be necessary and lakes can be formed directly in the conventional manner. As acid dyes there can be used any of those commonly employed in the formation of lakes. Thus there can be used eosin or the milling yellows.

Zirconia and hafnia particles can also advantageously be included in compositions in which their function is to bind or adsorb organic materials. Thus they can advantageously be used in anti-perspirants and deodorizers for use on the bodies of humans and animals. They can be included in a variety of compositions of conventional character which are applied as ointments, salves, or powders. Such compositions contain dusts, carriers, emollients, and the like. The amount of the zirconia or hafnia can be considerably varied depending upon the particular formulation, but ordinarily the amount will range from about 1 to 25 percent by weight.

Zirconia and hafnia can also be used as adsorbents for drugs and medicines, vaccines, enzymes, antibiotics, and other organic materials which are to be injected into the body or which are to be taken by mouth. They can also be used to adsorb impurities from such drugs and from other organic systems.

A preferred embodiment of the invention are fired bodies which contain zirconia or hafnia.

Zirconia and hafnia can be incorporated in enamels and glazes such as those described in U.S. Patents 2,396,856; 2,338,099; 2,474,636; and 2,427,682. The zirconia or hafnia should be used in an amount of about 1 to 10 percent by weight based upon the weight of other components of the enamel or glaze.

Especially preferred products of the invention are refractories which contain zirconia or hafnia. The zirconia or hafnia can be used with any of the conventional refractory compositions known in the art.

Generally zirconia or hafnia particles will be used with refractory metal oxides and sulfides, refractory interstitial type compounds of carbon and nitrogen intermetallics of rare earths and refractory metals.

Refractory compositions including refractory metal oxides can be made with such oxides as aluminum oxide, barium oxide, beryllium oxide, calcium oxide, cerium oxide, chromic oxide, cobaltus oxide, gallium oxide, lanthanum oxide, magnesium oxide, maganese oxide $Mn_3O_4$, maganous oxide, neodymium oxide, nickel oxide, silica niobium oxide, strontium oxide, tantalum oxide, thorium oxide, titanium dioxide and titanium suboxides such as TiO, stannic oxide, tungstic oxide, uranium dioxide, vanadium oxides, VO, $VO_2$ $V_2O_3$, yttrium oxide, zinc oxide, and cadmium oxide. Of the above, zirconia and hafnia will ordinarly be used most desirably with alumina, silica, ceria, titania, magnesia, thoria, and calcia.

Zirconia and hafnia can also be used according to the invention with complex refractory oxides. Thus they can be used with chromite, burnt dolomite, magnesium aluminate, mullite, sillimanite, and zircon. Additionally, though less preferred as materials to be formed into refractory compositions with zirconia and hafnia, are strontium zirconate, thorium zirconate, nickel aluminate, magnesium zirconate, calcium silicate, beryllium zirconate, and barium zirconate.

Zirconia and hafnia can be used to form refractories with refractory interstitial type and intermetallic compounds. Thus they can be used with the refractory borides, carbides, nitrides, silicides, sulfides, aluminides, and titanides of transition metals, alkali earth metals, and thorium and uranium. Compounds of the transition

| Aluminides | Borides | Carbides | Nitrides | Silicides | Sulfides |
|---|---|---|---|---|---|
|  | aluminum | aluminum | aluminum<br>barium | aluminum |  |
|  |  | boron |  |  | barium. |
|  |  |  |  | calcium | calcium. |
|  | chromium | chromium |  | chromium | chromium. |
|  | hafnium | hafnium | hafnium |  |  |
|  | iron | iron |  | iron |  |
|  | molybdenum |  |  | molybdenum | magnesium. |
|  |  | niobium | niobium |  |  |
| nickel | nickel |  |  | nickel |  |
|  |  | silicon | silicon |  |  |
|  |  |  |  |  | strontium. |
|  |  | tantalum | tantalum | tantalum |  |
|  |  | thorium | thorium | thorium | thorium. |
|  | titanium | titanium | titanium | titanium | titanium. |
|  | tungsten | tungsten |  | tungsten |  |
|  |  | uranium |  | uranium | uranium |
|  |  |  | vanadium | vanadium |  |
|  | zirconium | zirconium | zirconium | zirconium |  |

A sol of zirconia or hafnia can be sprayed upon a heated metal surface or heated refractory surface to give a binding effect and modification of the surface thus treated.

Zirconia and hafnia can also advantageously be used for benefiting graphite to increase its resistance to oxidation. This can be done by coating the graphite, by compressing a mixture of graphite with hafnia or zirconia, with or without suitable binders, or by impregnating a graphite article with zirconia or hafnia in water or a suitable organic liquid.

Fired bodies containing zirconia or hafnia as above described and the various refractories shown will for a considerable part contain the zirconia and hafnia particles in a relatively unmodified condition. This can be observed by appropriate analytical techniques.

However in some products where there is sintering or even melting of all or a number of the components of the refractory there can be crystal growth or modification of the zirconia or hafnia or even a reaction with other components of the system. There can also be a change of crystal habit. For most of the products it will be assumed that the particles are present in their original state as determined by electron micrograph and the other techniques above described. Sometimes this can be confirmed only with difficulty.

In some compositions and particularly where the zirconia will be heated to such a temperature that there is a change of crystal form, there is advantage in adding or having present some calcium oxide. When such compositions containing calcium oxide and zirconia or hafnia are heated up to about 1000° C. or above, the calcium oxide stabilizes the cubic form of the zirconia and hafnia.

Reference is made frequently above to the use of either zirconia or hafnia. It will be understood that in most relations these are equivalent and either can be used or mixtures can be used. However, in view of the much greater availability of zirconium intermediates, zirconia will be desirable and preferred in most use applications.

In order that the invention may be better understood the following specific examples are given in addition to those generally described above:

Example 1

A zirconia sol is prepared as in Example 1 of our copending application previously mentioned as follows:

A solution of 1 molar zirconium oxychloride with a Zr:Cl mol ratio of 1:1.89 is heated in a glass-lined steel autoclave to 200° C. for 4 hours. On cooling and centrifuging, a precipitate is recovered which analyzed about 40 percent solids. This precipitate is diluted to 25 percent solids with distilled water. The resulting slurry is then deionized by adding 2 percent of a cation exchange resin in hydrogen form and thereafter treating with an excess of an anion exchanger until the pH rose to 3.0. The cation exchanger used is "Nalcite" HCR, an aromatic hydrocarbon polymer containing nuclear sulfonic acid groups and it is of the general type described in D'Alelio U.S. Patent 2,366,007. The exchanger is added in a wet, drained state after degeneration with acid. The anion exchanger is regenerated, freshly washed and drained "Amberlite" IR-4B, which is a polyamine type.

The product obtained is a stable, colloidal zirconia sol containing about 25 percent of zirconia. The zirconia particles in the sol are about 10 millimicrons in diameter as shown by electron micrograph. The particles are dense and relatively non-aggregated, as shown by the relative viscosity, which is 3.0. The percent of solids, S, in the dispersed phase calculated as above described, is 55. The surface area is about 132 m.$^2$/g.

To 65 parts of a calcium oxide stabilized zirconia commercially available from the Norton Company under the trade name "Grade H Stabilized and Electrically Fused" is added 140 parts by weight of the zirconia sol prepared as above plus one part of calcium oxide. The mixture is ball milled in conventional manner for a period of 36 hours. The highly dispersed oxide mix is then treated to adjust the pH to approximately 4 and allowed to stand some 12 hours.

The resulting composition is then slip cast by conventional procedure into a plaster crucible mold. After drying the casting is fired first at approximately 1000° C. and then for 10 hours at 2200° C. in an electric furnace. The resulting highly compact crucible shows a density greater than that of a similarly prepared crucible made without the colloidal zirconia and is less fragile.

A hafnia sol prepared by hydrolysis of hafnium oxychloride as described above can be used in the same proportions to produce the same results as are shown above for a zirconia sol.

Example 2

Two hundred parts of a 25% ZrO$_2$ aquasol prepared as described in Example 1 is treated with sufficient ammonium hydroxide while agitating to raise the pH to 8, and at this point 2.5 grams of calcium oxide is added. This mixture is allowed to stand while agitating for two hours and is then filtered hot and washed with distilled water to remove the excess chloride ions. In the final washing ethyl alcohol is used to displace most of the water in the filter cake.

The filter cake is then dried at 110° C. for 10 hours and the dried cake so obtained is ground in a hammer mill to reduce it to fine particles. This powder is then transferred to a rod-shaped graphite mold and tamped to compact it. The mass is then compressed at 5000 pounds per square inch and fired at 1800° C. for 15 minutes. This rod shows unusually good stress rupture strength at 1000° C. and high thermal shock resistance. It is less fragile than similarly molded and sintered rods made from commercial zirconia.

A similar rod made from a hafnia sol prepared as in Example 1 in identical manner is likewise characterized by high strength.

Example 3

To 90 parts of −200 mesh calcium oxide is added 25 parts of a 25 percent colloidal zirconia sol prepared as in Example 1 but having particles of about 5 millimicrons average diameter, and 3 parts of rutile titania. After thorough mixing by dry grinding, the powder is dehydrated at 500° C. under vacuum.

The powder mix is reground and then compacted at 15,000 p.s.i. to form a metal fusing crucible. The temperature is raised slowly to 1700° C. and held at this temperature to achieve a well sintered, compact composition. The crucible shows good resistance to attack by molten titanium metal and phosphate melts, good thermal shock resistance and excellent stability toward moisture.

A hafnia sol can similarly be prepared and employed.

Example 4

A thorium oxide refractory can be made much denser by the incorporation of a small amount of colloidal zirconia. Such dense thoria refractories are especially useful for thermocouple tubes or wells which can be used in high temperature furnaces since they are impermeable to gases present in the furnace.

A zirconia sol is made in a process like that of Example 1 except that the 1 molar zirconium oxychloride solution is autoclaved at 125° C. The product is a zirconia sol containing 12 percent of solids. The sol has a relative viscosity of 1.415 which corresponds to a percent of solids, S, of 63. When diluted to 0.25 percent $ZrO_2$, the product has a percent transmission of 55 as measured on a Beckman Model DU spectrophotometer at a wave length of 400 millimicrons. The surface area of the products is about 200 m.$^2$/g. The sol was concentrated to 25 percent $ZrO_2$.

To 97.5 parts by weight of thorium oxide ground so as to pass a 300 mesh sieve is added 2.5 parts by weight of the colloidal zirconia as a 25 percent aquasol. Two parts of soluble starch are also added as a temporary binder. These ingredients are thoroughly mixed, and water is added to render the mixture sufficiently plastic so as to be readily formed into tubes which are first dried at 100° C. and then fired in a kiln to a temperature of 1800° C. Such tubes are found to be less porous than similar tubes prepared using conventional stabilized zirconia powders.

A hafnia sol can be made as above and employed in a barium oxide refractory with comparable results, all conditions and proportions being as shown above.

Example 5

A 0.5 molar zirconyl chloride solution is prepared by dissolving 644 g. $ZrOCl_2 \cdot 8H_2O$ in water and diluting to 2 liters. This solution is deionized to pH 3.1 by stirring it with an excess of anion exchange resin, freshly washed "Amberlite" IR–4B, in the regenerated form. The partly deionized solution has a Zr:Cl mol ratio estimated to be 1:1. This sol is autoclaved for 4 hours at 150° C., whereupon the pH drops to 1.1. The autoclaved sol, after cooling to room temperature, is further deionized to pH 3.2, using "Amberlite" IR–4B, as above. The deionized sol is then concentrated to about 20 percent $ZrO_2$ solids by vacuum evaporation.

The percent of solids, S, in the dispersed phase is 66 when calculated as above described. The surface area is about 175 m.$^2$/g.

A composition comprising 32 parts by weight of titania, 10 parts by weight of barium fluoride, 15 parts by weight of clay, and 43 parts by weight of $ZrO_2$ as the 25 percent aquasol described above is thoroughly mixed and sufficient water added to form a fluid paste.

The mixture is ball milled for 48 hours after which it is slip cast into a plaster of Paris mold in the shape of a thin dielectric wafer. The molded article upon drying is fired to a temperature between 1150–1300° C. The resulting fired product is homogeneous, dense, and nonporous and has excellent dielectric strength and power factor.

A duplicate bar made with relatively coarse commercially available zirconia shows higher porosity and lower dielectric strength. Because of the extreme purity of the colloidal zirconia, the dielectric constant of the product is higher and the power losses are lower than can be achieved with less pure, commercial zirconias.

Improved dielectric refractories for electrical insulation are similarly obtained by using colloidal zirconia in place of crude relatively coarse zirconia with combinations of fine particle size barium oxide and titanium oxide as in British Patent 684,474.

In the above example hafnia can be prepared and employed just as shown for zirconia. Again, half of the zirconia can be replaced by hafnia.

Example 6

563 grams of basic zirconium nitrate is dissolved in water and diluted to 3 liters. The pH of the solution is 0.3 and the total weight is 3300 grams. This solution is autoclaved without stirring at 200° C. for 4 hours in a glass bottle which is placed inside a steel autoclave.

On cooling to room temperature the product is found to be a slurry of aggregated zirconia particles having a pH of 0.2. The product is centrifuged at 2000 r.p.m. for 15 minutes in an International Centrifuge, size 3, Model FS, using 1.5 l. cups. 2800 grams of liquor is removed. The remaining wet cake, weighing about 500 grams, contains about 45 percent solids.

The viscosity of the wet cake is reduced by adding 100 grams of water. The resulting mixture is deionized by adding 24 grams of "Nalcite" HCR in the hydrogen form and 120 grams of freshly washed, carbonate regenerated "Amberlite" IR–4B. During deionization, the viscosity is reduced considerably, and after filtering through glass wool to remove the resin, a stable zirconia sol is obtained.

The sol contains zirconia particles 100 millimicrons in diameter as determined from the electron micrograph. Based on a particle size of 100 millimicrons the surface area of the particles in the sol is calculated to be 10 m.$^2$/g. It contains 39.2 percent of solids. Its pH is 3 and its relative viscosity 5.57. The $ZrO_2$:$NO_3$ mol ratio in the sol is approximately 35:1. The percent of solids, S, in the dispersed phase is calculated from the relative viscosity and found to be 70.

To the colloidal zirconia sol 1 percent of starch and 5 percent of slaked lime is added. The mixture is cast into a plaster mold for electrical furnace heating elements. The green element is dried slowly at temperatures increasing progressively up to 1100° C., and thereafter it is fired for 3 hours at 2100° C.

The element shows unusually good stress rupture strength and excellent thermal shock compared to conventional zirconia elements when used at temperatures ranging from 1000 to 2300° C.

A hafnia sol can be prepared as shown above and employed in the preparation of a furnace heating element as shown above.

Example 7

Three liters of 0.13 molar $ZrO(NO_3)_2$ solution is autoclaved for 4 hours at 150° C. The zirconyl nitrate on analysis has a Zr:$NO_3$ mol ratio of 1:1.91. The resulting zirconia sol is cooled and its pH is found to be 0.92. To 2500 ml. of this sol there is added 500 grams of freshly washed "Amberlite" IR–4B and 100 grams of "Nalcite"

HCR is thereafter added. The sol thus deionized has a pH of 4.8. It is then filtered through glass wool. 50 ml. of the undeionized zirconia sol is added to the filtered sol to lower the pH to 4.0. The sol is then concentrated by vacuum evaporation to 250 ml.

The product so obtained has the following characteristics: pH is 4.03; $Zr:NO_3$ ratio about 10:1; particle size by electron microscope about 10 millimicrons; percent $ZrO_2$ is 16; the percent of solids, S, in the dispersed phase as determined from viscosity is 47; surface area of a powder obtained by drying sol to $ZrO_2$ powder is 155 m.$^2$/g. When diluted to 0.3 percent solids, this sol has a percent transmission of 11 as measured on a Beckman Model DU spectrophotometer at a wave length of 400. The sol is stable for at least five months storage at room temperature.

The sol is concentrated to 25 percent $ZrO_2$.

A furnace refractory brick is made by conventional procedure of firing a dry mix consisting of 90 parts by weight of commercially available zircon grit, 40 parts of the 25 percent colloidal zirconia sol, and 0.5 part of finely ground lime. After drying, the green brick is fired at 1000° C. and then at 1500° C. Compared to a conventional zircon brick, those bonded with colloidal zirconia show greater resistance to thermal shock and greater resistance to fracture on impact.

A brick made with a hafnia sol similarly prepared and used in amounts as shown above is similarly resistant to thermal shock and fracture.

*Example 8*

This example relates to a colloidal zirconia modified silicon carbide refractory using a zirconia sol prepared as in Example 7. The following composition is prepared:

| | Parts by weight |
|---|---|
| 4–36 mesh size silicon carbide grain | 46 |
| 80 mesh size and finer silicon carbide grain | 35 |
| 200 mesh size or finer silicon powder | 15 |
| $ZrO_2$ as a 25 percent aquasol | 15 |
| Calcium oxide | 0.75 |
| Bentonite gel | 6 |

These ingredients, with the exception of the bentonite gel, are mixed in a tumbling barrel for 15 minutes to get good blending and then wet mixed an additional one-half hour in a kneader mixer. This mix is then wet to the proper pressing consistency with the bentonite gel and then molded into a rocket motor nozzle by pressing. This pressing can be done in a hydraulic press at a pressure in excess of 500 pounds per square inch.

The molded shapes are dried at 90–120° C. and placed in a muffle furnace through which a continuous stream of commercial grade nitrogen is passed. The temperature in the furnace chamber is gradually raised over a period of several hours to 1400° C. and the temperature held there until the articles have increased in weight from 7 to 10 percent of the dry unfired weight. Such rocket nozzles are more highly resistant to thermal shock, spalling, and impact than similar nozzles made from the relatively coarse commercial stabilized zirconias available in powder form. Such compositions can also be shaped into resistance elements for electric furnaces.

A hafnia sol can be used as above with similar results.

*Example 9*

A colloidal zirconia sol as prepared in Example 4 is deionized with an anion exchanger "Amberlite" IR–4B in the hydroxide form to remove most of the chloride ion and then dried at a temperature of 110° C. A phenol treated and dewaxed bright stock petroleum oil with a 0.5 acid number was contacted with this dry zirconia. The dry zirconia was added to the oil under a nitrogen blanket with stirring and heating to 560° F. The stirring was continued for 10 minutes after which the acid-free oil was filtered by suction through "Celite." Using the dry zirconia at a rate of about 15 pounds per barrel of lubricating oil is sufficient to reduce the acid number to zero. This adsorbing efficiency is far superior to that obtained using conventional hydrous zirconia.

This colloidal zirconia can also be used to purify aqueous solutions containing vitamin $B_{12}$.

A hafnia sol can similarly be dried and can be used as shown above.

*Example 10*

To 100 parts of an aqueous colloidal dispersion of polytetrafluoroethylene containing 4 percent polymer there is added 20 parts by weight of a 1 percent solution of dodecylamine acetate and 2 parts of a 25 percent zirconia sol prepared as in Example 7. A saturated solution of ammonium bicarbonate is added in small increments with stirring to this mixture until precipitation of the voluminous floc is complete and the supernatant liquid is clear. The floc is vacuum filtered and acetic acid is added with stirring to the wet floc until the pH is 5.5. This mixture is allowed to stand with occasional stirring for several minutes until the solid mixture peptizes to the colloidal state. This codispersion is concentrated by evaporation at 60° C. to 50 percent solids.

No. 28 standard gauge copper wire is passed at a rate of 5 feet per minute through this dispersion followed by baking for approximately 20 seconds at 375° C. After four passes through the solution there is obtained a coating one mil thick on the wire which is smooth, glossy, and slightly milky in appearance. It is found that the coating of polytetrafluoroethylene on the copper wire is much more adherent than when other types of hydrous oxides are used.

A hafnia sol can similarly be used.

*Example 11*

A 10 gram sample of a copolymer of 90 percent vinyl chloride and 10 percent diethyl fumarate are milled separately with 2 ml. of dibutyl sebacate. 0.2 gram of colloidal zirconia derived from the aqueous colloidal dispersion of Example 4 by drying at 110° C. was also added during milling at 140° F. for 5 minutes and then for 5 minutes at 212° F. The filled copolymer was then rolled into a sheet 1 mm. in thickness.

It is found that the heat stability of such a vinyl copolymer at 135° C. is greatly improved by the presence of the colloidal zirconia. Furthermore, because of the high surface area of the particular colloidal zirconia described above the effect is even more striking than that observed with other forms of zirconium dioxide previously used in the art.

Dried hafnia can similarly be used.

*Example 12*

Colloidal zirconia can be used for the surface treatment of wool to impart a coarser, less slippery, delustered and bulked character to the fibers of the wool to make it more suitable as a carpet material. The wool which is most amenable to this treatment is the so-called BA type wools which are soft and silk-like and come from the Lincoln type sheep from the Argentine and New Zealand.

To 1000 pounds of raw BA wool stock is added 4000 gallons of water and, after stirring, 20 pounds of $ZrO_2$ is added as the 25 percent aquasol of Example 1. There is added 1 percent of the non-ionic surface active agent Emulfor ON–870 a polyoxyethylated fatty alcohol manufactured by General Aniline and Film Corporation. The bath is brought to a boil and allowed to stand for several hours until the zirconia is completely exhausted on the wool surface. The wool fiber so treated is rinsed and dried and is then suitable for further workup into yarn which then can be woven as a pile of a pile floor covering. The wool so treated is found to process much easier into a woven and pile fabric than similar yarns treated with other types of zirconium dioxide. It is also more resistant to soiling.

Example 13

Zirconia particles as shown can be used as catalyst supports. Because of the high surface area and purity of the colloidal zirconia it is especially suitable as a support, for example, in the preparation of a catalyst for the conversion of aldehydes to nitriles and in the cracking of petroleum hydrocarbons.

Two hundred grams of chromic acid, $CrO_3$, is dissolved in 3.5 liters of a 25 percent zirconia sol prepared as in Example 3 and 100 cc. of ethyl alcohol is gradually added to this mixture over a period of one hour. The solution is allowed to stand for 4 hours and the addition of alcohol is repeated. The solution is heated to reflux and maintained at that temperature for 24 hours. At the end of this period the solution is filtered and the cake so obtained is dried at 110° C.

This black cake is broken up into 6–8 mesh size and used as catalyst for the conversion of propionaldehyde to propionitrile. For this purpose propionaldehyde and ammonia vapors are passed over the catalyst at a temperature of 480° C. at atmospheric pressure for about 3 seconds contact time. Excellent conversion to the nitrile is obtained. This degree of conversion is far higher than that obtained when using a much lower surface area catalyst support.

A hafnia sol can similarly be used in the preparation of a catalyst.

Example 14

Colloidal zirconia can be used in pharmaceutical compositions which are effective as deodorants and anti-perspirants. The chloride ion in a zirconia sol prepared as described in Example 1 but having particles of 5 millimicrons average diameter is replaced by ion exchange with the hydroxyacetic acid form of "Amberlite" IRA 400. To prepare the hydroxyacetic acid form, the usual chloride form of the ion-exchange resin is treated with an excess of hydroxyacetic acid.

A cream of the so-called "vanishing" type is made by melting together 220 grams of stearic acid and 40 grams of anhydrous lanolin. The molten mixture is then slowly added with constant vigorous stirring to a mixture of 12.5 grams of triethanolamine, 75 grams of diethylene glycol monoethyl ether and 200 ml. of water which has been heated to 95° C. The stirring is continued as the blended ingredients cool. While cream is still a little above room temperature, 100 ml. of the zirconia sol is stirred into it.

To obtain a smoother cream, the mixture can be passed through a homogenizer or colloid mill. This type of vanishing cream is found to be quite effective as an antiperspirant and deodorizer because of the extremely high surface area and purity of the colloidal zirconia.

Example 15

Zirconia sand is ground to a size of about 2 to 50 microns. To 17 grams of this ground zirconia there is added 8 grams of zirconia in the form of an aquasol prepared as in Example 7 and 8 grams of zirconia also as an aquasol of the type described in Example 6. This wet mix is placed in a vacuum oven and dried at room temperature for 24 hours. The dried mass was then heated to 110° C. for an additional 24 hours. It was finally heated to 1500° C. to produce a very hard zirconia refractory.

Using a hafnia sol prepared in similar manner a comparable hafnia refractory is obtained.

This application is a continuation-in-part of our copending applications Serial Nos. 483,973, filed January 25, 1955, and 566,969, filed February 21, 1956, both now abandoned.

We claim:

1. A composition consisting essentially of an unfired mixture of a bound refractory material and, as a binding agent therefor, from 5 to 35% by weight of a metal oxide selected from the group consisting of zirconia and hafnia in the form of a sol of particles having a surface area from 5 to 400 m.$^2$/g., being composed of ultimate particles of 5 to 200 millimicrons and which when dispersed in a liquid medium form a dispersion in which the percent of solids in the dispersed phase is at least 30.

2. A composition consisting essentially of an unfired mixture of a material selected from the group consisting of refractory metal oxides and borides, carbides, nitrides, silicides, sulfides, aluminides, and titanides of transition metals, alkaline earth metals, thorium and uranium and, as a binding agent therefor, from 5 to 35% by weight of a metal oxide selected from the group consisting of zirconia and hafnia in the form of a sol of particles having a surface area from 4 to 400 m.$^2$/g., being composed of ultimate particles of 5 to 200 millimicrons and which when dispersed in a liquid medium form a dispersion in which the percent of solids in the dispersed phase is at least 30.

3. In a process for making a refractory product, the steps comprising mixing a refractory material selected from the group consisting of refractory metal oxides and borides, carbides, nitrides, silicides, sulfides, aluminides, and titanides of transition metals, alkaline earth metals, thorium and uranium, with a sol of an oxide of a metal selected from the group consisting of zirconium and hafnium, the sol having an average particle size from 5 to 200 millimicrons and having a surface area from 5 to 400 m.$^2$/g., the percent of solids in the dispersed phase being at least 30, and the proportion of said oxide selected from oxides of zirconium and hafnium being from 5 to 35% by weight based on the refractory material, and thereafter heating the mixture to at least incipient fusion.

4. In a process for making a refractory product, the steps comprising mixing calcium oxide, a material selected from the group consisting of refractory metal oxides, and borides, carbides, nitrides, silicides, sulfides, aluminides, and titanides of transition metals, alkaline earth metals, thorium and uranium with a sol of an oxide of a metal selected from the group consisting of zirconium and hafnium, the sol having an average ultimate particle size from 5 to 200 millimicrons and having a surface area from 5 to 400 m.$^2$/g., the percent of solids in the dispersed phase being at least 30, and the proportion of said oxide selected from oxides of zirconium and hafnium being from 5 to 35% by weight based on the refractory material, and thereafter heating the mixture to at least incipient fusion.

References Cited in the file of this patent

UNITED STATES PATENTS

| | | |
|---|---|---|
| 1,049,005 | Steinmetz | Dec. 31, 1912 |
| 1,816,006 | Easter | July 28, 1931 |
| 1,951,718 | Ziese | Mar. 20, 1934 |
| 2,694,646 | Wagner et al. | Nov. 16, 1954 |
| 2,769,718 | Ault | Nov. 6, 1956 |
| 2,788,284 | Hilton et al. | Apr. 9, 1957 |

FOREIGN PATENTS

| | | |
|---|---|---|
| 106,485 | Austria | May 25, 1927 |

UNITED STATES PATENT OFFICE
CERTIFICATE OF CORRECTION

Patent No. 2,984,576                                  May 16, 1961

Guy B. Alexander et al.

It is hereby certified that error appears in the above numbered patent requiring correction and that the said Letters Patent should read as corrected below.

Column 3, line 37, for "fiigure" read -- figure --; column 4, line 17, for "composition" read -- compositions --; column 16, line 22, for "4 to 400" read -- 5 to 400 --.

Signed and sealed this 10th day of October 1961.

(SEAL)
Attest:

ERNEST W. SWIDER
Attesting Officer

DAVID L. LADD
Commissioner of Patents

USCOMM-DC